United States Patent [19]
Tsuji
[11] Patent Number: 4,727,499
[45] Date of Patent: Feb. 23, 1988

[54] SERVICE ESTIMATION APPARATUS FOR ELEVATOR

[75] Inventor: Shintaro Tsuji, Nagoya, Japan
[73] Assignee: Mitsubishi Denki Kabushiki Kaisha, Japan

[21] Appl. No.: 804,758
[22] Filed: Dec. 5, 1985
[30] Foreign Application Priority Data
Dec. 6, 1984 [JP] Japan .................. 59-258213
[51] Int. Cl.[4] .................. B66B 1/18; G06F 15/20
[52] U.S. Cl. .................. 364/554; 187/101; 187/130
[58] Field of Search .................. 364/149, 151, 424, 493, 364/554; 187/101, 130, 135, 138, 139

[56] References Cited

U.S. PATENT DOCUMENTS

| | | | |
|---|---|---|---|
| 4,133,039 | 1/1979 | Eichenlaub | 364/554 |
| 4,401,192 | 8/1983 | Trosky et al. | 187/130 |
| 4,542,463 | 9/1985 | Uetani | 364/554 X |
| 4,567,566 | 1/1986 | Araya et al. | 364/554 |
| 4,612,624 | 9/1986 | Tsuji | 364/554 X |
| 4,672,531 | 6/1987 | Uetani | 364/424 X |
| 4,677,577 | 6/1987 | Takabe et al. | 364/554 |

FOREIGN PATENT DOCUMENTS

| | | | |
|---|---|---|---|
| 51-47017 | 8/1976 | Japan . | |
| 58-56711 | 9/1983 | Japan . | |
| 59-163279 | 1/1984 | Japan . | |
| 2128774 | 5/1984 | United Kingdom | 187/130 |

*Primary Examiner*—Errol A. Krass
*Assistant Examiner*—Joseph L. Dixon
*Attorney, Agent, or Firm*—Leydig, Voit & Mayer

[57] ABSTRACT

A service estimation apparatus for an elevator adopting an estimated index with which service by the elevator can be estimated in any building and under any traffic state comprising a measurement apparatus to measure periods of service time and a microprocessor operating under program control to calculate a mean value and a variance of the periods of service time to set a reference value for designating a range of the periods of service time and to determine the estimated index, namely, an upper limit presumption value based on the mean value, the variance, and the reference value, and to determine an unachieved rate of service reference corresponding to the upper limit presumption value, the unachieved rate of service reference being a probability value at which the elevator periods of service time fall outside the range designated by the reference value.

9 Claims, 7 Drawing Figures

SERVICE ESTIMATION APPARATUS FOR ELEVATOR

BACKGROUND OF THE INVENTION

This invention relates to a service estimation apparatus for an elevator which calculates a new index for estimating the state of service by the elevator.

It has heretofore been common practice that the number of hall calls, periods of waiting time, etc. are actually measured in a building in which an elevator is operating, to decide from the measured results whether or not the situation of service by the elevator is favorable, whether the service situation is better or worse than in other buildings, and so forth. As is well known, the service state of an elevator, for example, the distribution of periods of waiting time differs greatly depending upon conditions special to a building (such as the purpose, the number of floors, and the heights of floors of the building; the number, the rated speed, and the rated capacity of elevator cages; a group-supervisory system; and traffic volume fluctuating in accordance with time zones). Accordingly, the estimated index of elevator service should desirably be one with which the service states can be readily compared and calculated with each even when the conditions special to buildings are different.

Conventionally speaking, the mean periods of waiting time, the maximum periods of waiting time are the most commonly used estimated indices. As the mean periods of waiting time and the maximum periods of waiting time are shorter and as the rate of occurrence of long waits is smaller, the service is decided better. Recently, however, more importance is attached to the rate of occurrence of long waits (the proportion of hall calls whose periods of waiting time become, for example, at least 60 seconds with respect to all hall calls) than to the mean periods of waiting time in the estimation.

Furthermore, in some applications, the riding period of time (a period of time required for a person to reach a destination floor since getting on a cage), the service completion period of time (a period of time required for the person to reach the destination floor since entering a hall), etc. are utilized in addition to the periods of waiting time of the hall call in the service estimation of the elevator.

Heretofore, various apparatuses for measuring and estimating the state of service by an elevator as described above have been proposed.

Examples of the proposals are an elevator operation data-collecting apparatus described in Japanese Patent Application Publication No. 58-56711, in which the numbers of persons who get on and off elevator cages are automatically collected and are stored in a recording device and in Japanese Patent Application Laid-Open No. 59-163279, in which various data items concerning elevator traffic are measured to calculate the mean periods of waiting time, the rate of occurrence of long waits, the rate of missing of forecasts, etc. as the estimated service indices of the elevator, and when the estimated service index has become worse than a predetermined value in which an alarm is issued on a display unit.

Further, in view of the above-stated fact that importance is attached to the rate of occurrence of long waits as a estimated service index, an operating state measurement apparatus described in Japanese Patent Application Publication No. 51-47017 has proposed that the mean periods of waiting time $W_m$, the variance of waiting time $W_v$, and the rate of occurrence of long waits $P_r$ are actually measured, and that on the basis of resuts obtained by analyzing the actually measured data by means of tabulation and a statistic method, the rate of occurrence of long waits whose periods of waiting time are longer than N times the mean periods of waiting time $W_m$, denoted by $P_r(W>N\cdot W_m)$, is approximately calculated by the following linear function:

$$Pr(W > N \cdot Wm) = a \cdot \frac{\sqrt{Wv}}{Wm} - b$$

which is used as a service index..

In case of using the rate of occurrence of long waits as the estimative index, however, there have been several problems. Since the system which calculates the rate of occurrence of long waits supply from the proportion of long wait calls occupies among measured hall calls, when the number of the measured hall calls is not sufficient, or when a reference value for deciding the long wait (hereinbelow, termed 'long wait reference value') is set to a value which is excessively great in comparison with a mean value, the calculated rate of occurrence of long waits becomes zero by way of example, resulting in the problem that the quality of service of the concerned elevator cannot be compared with that of another elevator. Meanwhile, with the system which presumes the rate of occurrence of long waits Pr from the aforementioned approximation formula, the long wait reference value is set according to the product N·Wm between the constant N and the mean periods of waiting time Wm. In this regard, in case of comparing the particular situation of service with those in another time zone and another building, the mean periods of waiting time Wm differ under the respective conditions, and hence, the long wait reference values become diverse. This leads to the problem that the comparisons are difficult with the long wait occurrence rate Pr. In addition, when it is intended to make comparisons by the use of an identical long wait reference value, the constants a and b need to be previously determined for all the values of the constant N. Moreover, since the shape of the distribution of hall calls changes depending also upon the group-supervisory system, the intended purpose of a building, etc., the constants a and b are determined beforehand in relation to these individual factors. This leads to the problem that laborious determination is involved.

SUMMARY OF THE INVENTION

This invention has been made in order to eliminate the problems as stated above, and has for its object to provide, in a service estimation apparatus for an elevator wherein the quality of service, namely, whether the service of the elevator is good or bad, is decided according to a proportion at which a service state for measuring the degree of service in terms of the length of time, such as a period of waiting time, a riding period of time, or a service completion period of time (the service state shall be termed 'service period of time') falls within a predetermined time range corresponding to a preset reference value (the proportion shall be hereinbelow termed 'achieved rate of service reference' as opposed to 'unachieved rate of service reference', and for example, the rate of occurrence of long waits corresponds to the unachieved rate of service reference), a service estimation apparatus for an elevator which calculates a new estimated index with which the quality of service can be simply and reliably decided for any building and under any traffic state.

The service estimation apparatus for an elevator according to this invention comprises means to measure periods of service time and to calculate the mean value and variance thereof, means to set a reference value for designating the range of the periods of service time, and means to receive at least the mean value, the variance and the reference value so as to presume the upper limit value of the unachieved rate of service reference of the periods of service time.

The service estimation apparatus for an elevator in this invention presumes the upper limit value of the unachieved rate of service reference of the periods of service time such as the periods of waiting time of hall calls, and delivers the presumed upper limit value as a service index.

BRIEF DESCRIPTION OF THE DRAWINGS

FIGS. 1-7 show an embodiment of a service estimation apparatus for an elevator according to this invention, in which:

FIG. 1 is a general arrangement diagram of the embodiment of this invention;

FIGS. 2-4 are explanatory diagrams showing the distributions of the periods of waiting time of hall calls;

FIG. 5 is a block diagram of an electric circuit;

FIG. 6 shows memory maps; and

FIG. 7 is a flow chart of a program.

In the drawings, the same symbols indicate identical or corresponding portions.

DESCRIPTION OF THE PREFERRED EMBODIMENT

Figure 1:
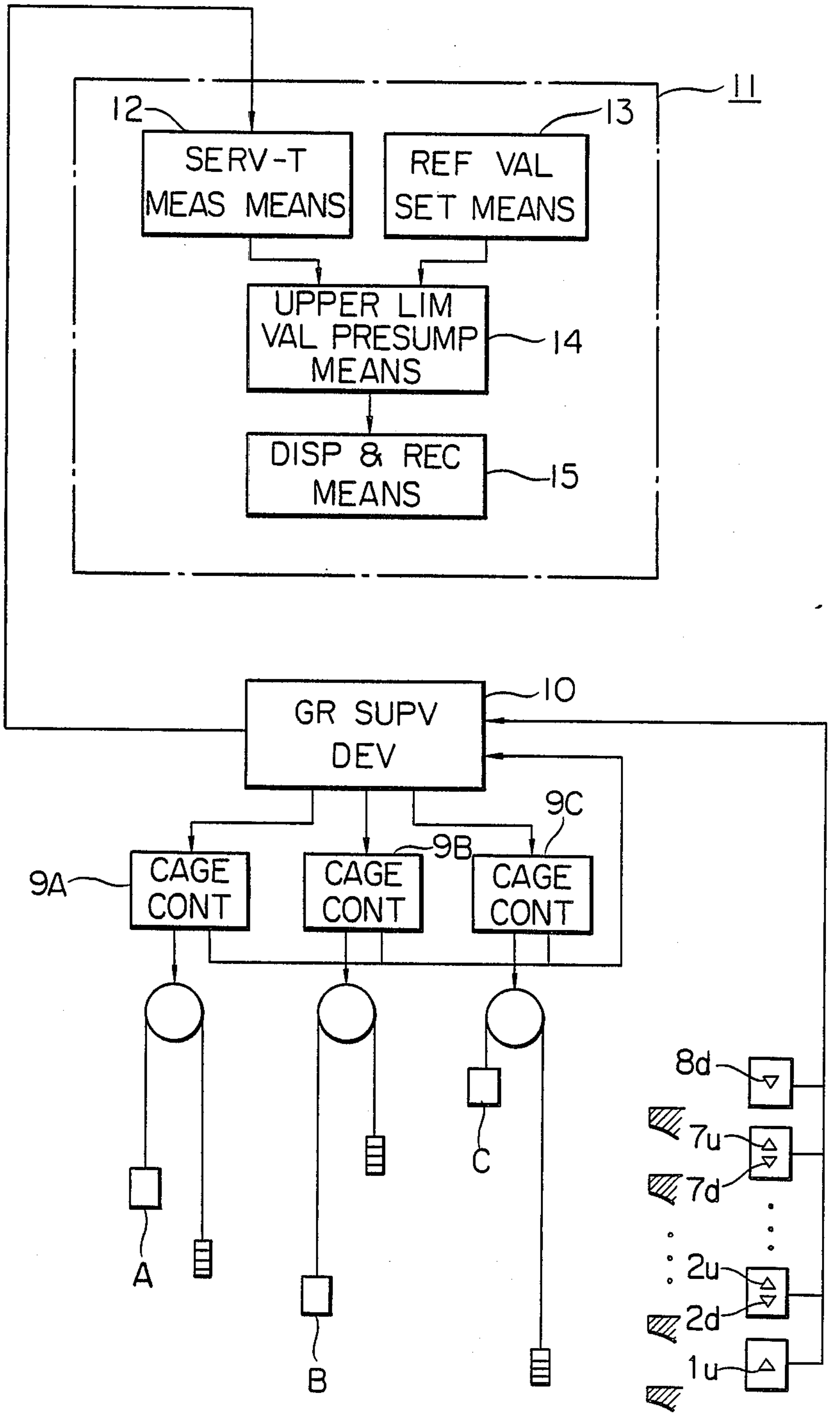

Now, an embodiment of this invention will be described with reference to FIGS. 1-7. FIG. 1 is a general arrangement diagram for clearly showing the arrangement of one embodiment of the service estimation apparatus for an elevator according to this invention. In an eight-storeyed building, three cages A (=cage No. 1), B (=cage No. 2) and C (=cage No. 3) are installed. The first floor—seventh floor are furnished with up buttons 1*u*-7*u* for registering up calls, while the second floor--eighth floor are furnished with down buttons 2*d*-8*d* for registering down calls. Cage controllers 9A-9C disposed in a machinery room control the operations or registering and cancelling cage calls, the operations of opening and closing doors, the operations of responses (such as the operations of setting traveling directions, and the operations of running and stopping cages) to calls (cage calls and allotted hall calls), etc. of the respective cages A, B and C. On the basis of input signals from the up buttons 1*u*-7*u* and the down buttons 2*d*-8*d* and hall call cancelling commands from the cage controllers 9A-9C, a group supervision device 10 which is also installed in the machinery room registers and cancels hall calls, and it allots the hall calls to the cages and gives commands to the cage controllers 9A-9C in order to cause the cages to respond to the registered hall calls. The service estimation apparatus 11 is installed in a management room. It is constructed of service time measurement means 12 to measure the periods of waiting time of the hall calls on the basis of hall call signals input from the group supervision device 10 and to calculate the mean value and variance thereof, reference value setting means 13 to set a reference value for designating the range of the periods of waiting time, upper limit value presumption means 14 to receive the mean value, variance and reference value so as to presume the upper limit value of the probability of occurrence of hall calls whose periods of waiting time fall within a predetermined range corresponding to the reference value, and display and record means 15 to inform a person-in-charge of the presumed upper limit value and to record it.

Figure 2:
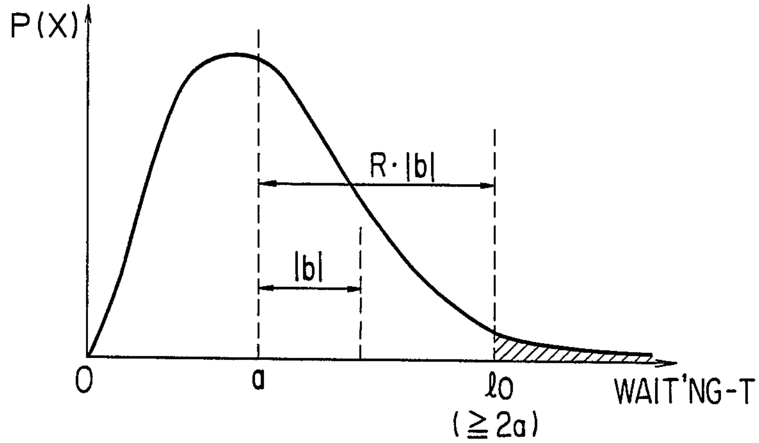
Figure 3:
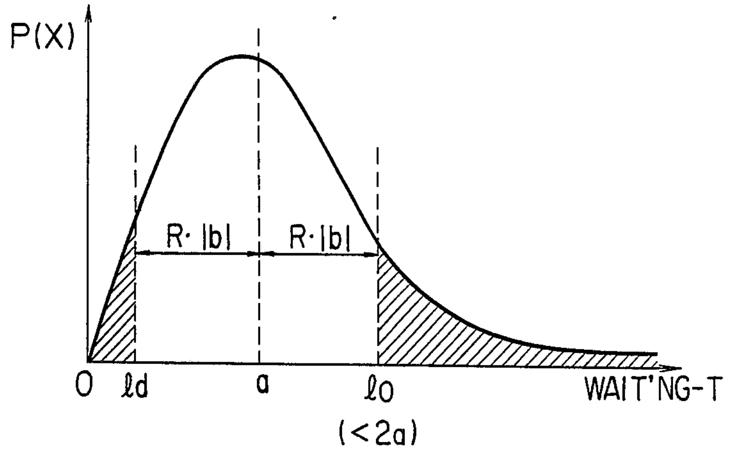

FIGS. 2 and 3 show an example of the distribution of the periods of waiting time of hall calls. In the figures, a denotes the mean value of the periods of waiting time, $b^2$ the variance thereof ($|b|$ being the standard deviation thereof), R a postivie number, and lO and ld reference values. Letting p(x) denote the probability density function of the periods of waiting time x ($x \geqq 0$), the mean value a and the variance $b^2$ are respectively expressed as follows:

$$a = \int_0^\infty xp(x)dx \quad (1)$$

$$b^2 = \int_0^\infty (x-a)^2 p(x)dx \quad (2)$$

$$\text{where } \int_0^\infty p(x)dx = 1 \quad (3)$$

The reference value lO in FIG. 2 is $lO \geqq 2a$ and is expressed as:

$$lo = a + R \cdot |b| \left( \text{for } R \geqq \frac{a}{|b|} \right) \quad (4)$$

while the reference value lO in FIG. 3 is $lO < 2a$ and is expressed as:

$$lo = a + R \cdot |b| \left( \text{for } R < \frac{a}{|b|} \right) \quad (5)$$

$$ld = a - R \cdot |b| \left( \text{for } R < \frac{a}{|b|} \right) \quad (6)$$

In FIG. 2, the probability of occurrence $L_1$ of the hall calls whose periods of waiting time x become greater than the reference value lO (the probability is a value equivalent to the area of a hatched part in FIG. 2, and is the unachieved rate of service reference corresponding to the reference value lO) becomes:

$$L_1 = 1 - \int_0^{lo} p(x)dx \quad (7)$$

$$= \int_{lo}^{\infty} p(x)dx \text{ (for } lo \geqq 2a\text{)}$$

On the other hand, in FIG. 3, the probability of occurrence $L_2$ of the hall calls whose periods of waiting time x fall within regions [O, ld] and [10, ∞] (the probability is a value equivalent to the area of hatched parts in FIG. 3, and is the unachieved rate of service reference corresponding to the reference values ld and lO) becomes:

$$L_2 = 1 - \int_{ld}^{lo} p(x)dx \quad (8)$$

$$= \int_{o}^{ld} p(x)dx + \int_{lo}^{\infty} p(x)dx \text{ (for } lo < 2a)$$

By the way, $(1-L_1)$ and $(1-L_2)$ correspond to the achieved rates of service reference.

Figure 4:
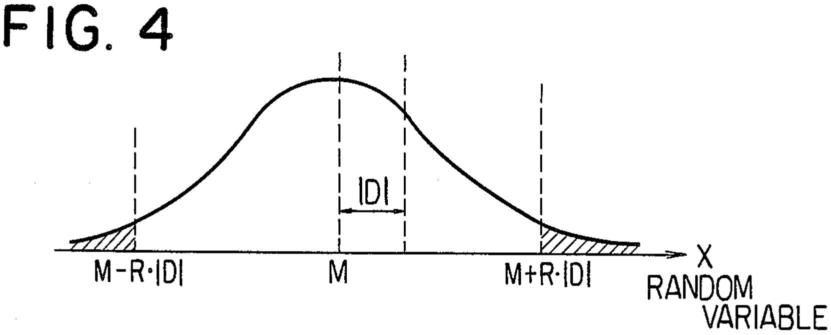

Meanwhile, according to the Tchebycheff inequality, it is known that when the mean of a random variable X is denoted by M, the variance thereof by $D^2$ and an arbitrary plus number by R as indicated in FIG. 4, the probability $P[|X-M|>R\cdot|D|]$ at which $|X-M|>R\cdot|D|$ holds (the probability is a value equivalent to the area of hatched parts in FIG. 4) becomes as given by Eq. (9):

$$P[|X-M| > R\cdot|D|] \leqq \frac{1}{R^2} \quad (9)$$

When this equation (9) is applied to the aforementioned equations (7) and (8), the following inequalities (10) and (11) hold on the basis of the relations of the equations (5) and (6):

$$L_1 = \int_{lo}^{\infty} p(x)dx \leqq \frac{1}{R^2} = \frac{b^2}{(lo-a)^2} \quad (10)$$

$$\text{(for } lo \geqq 2a)$$

$$L_2 = \int_{o}^{ld} p(x)dx + \int_{lo}^{\infty} p(x)dx \leqq \frac{1}{R^2} = \quad (11)$$

$$\frac{b^2}{(lo-a)^2} = \frac{b^2}{(a-ld)^2}$$

$$\text{(for } lo < 2a)$$

The right-hand side $$\frac{b^2}{(lO-a)^2}$$

of the above equation (10) is to be called the "upper limit value of the probability of occurrence $L_1$", while the right-hand side $$\frac{b^2}{(lO-a)^2}$$

or $$\frac{b^2}{(a-ld)^2}$$

of the above equation (11) is to be called the "upper limit value of the probability of occurrence $L_2$".

The present embodiment presumes the upper limit value of the probability of occurrence $L_1$ or the probability of occurrence $L_2$ on the basis of the right-hand sides of Eqs. (10) and (11), namely:

$$f = \frac{b^2}{(lO-a)^2} \quad (12)$$

The mean value a and the variance $b^2$ are calculated by the following equations (13) and (14):

$$a = \frac{1}{m}\sum_{k=1}^{m} x_k \quad (13)$$

$$b = \frac{1}{m}\sum_{k=1}^{m} (a-x_k)^2 \quad (14)$$

where m denotes the number of hall calls, and $x_k$ (k=1, 2, . . . , m) the periods of waiting time of the hall calls.

Figure 5:
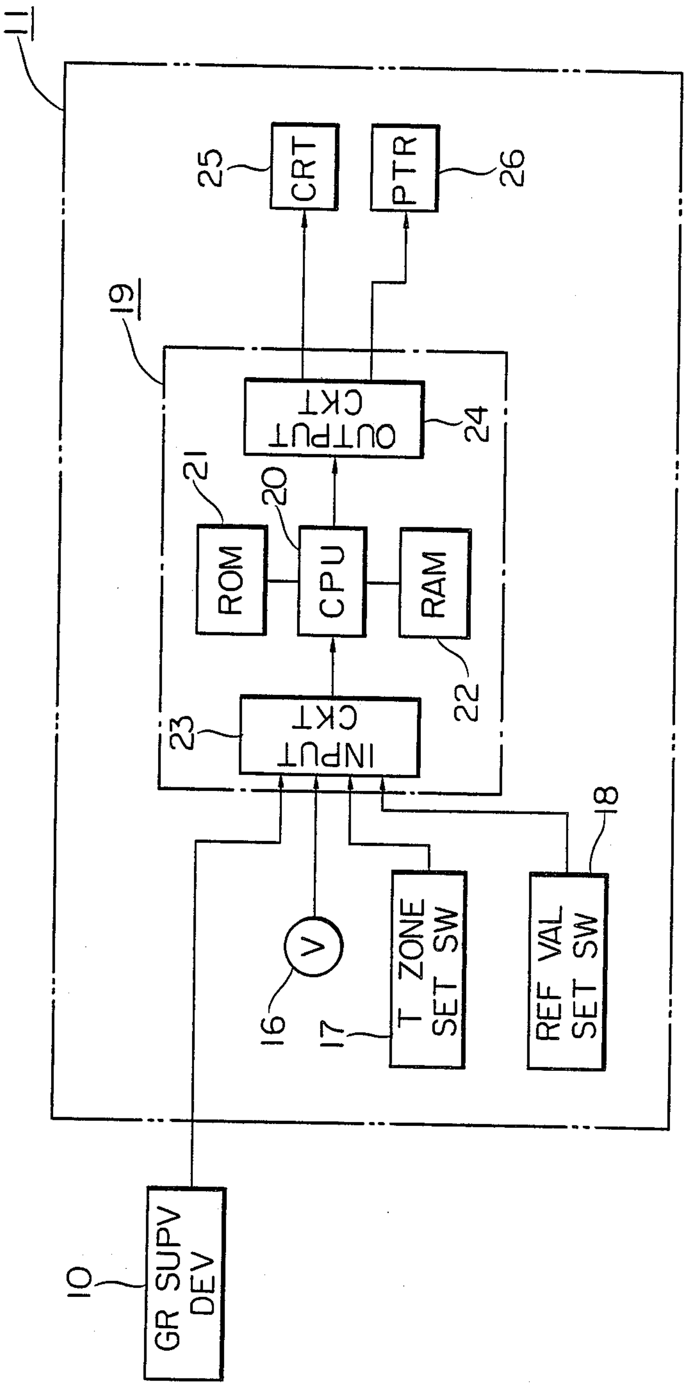

FIG. 5 is a system block diagram of the embodiment in FIG. 1. In the diagram, numeral 16 indicates a clock which is disposed in the service estimation apparatus 11 and delivers a time signal, numeral 17 a time zone setting switch which similarly delivers a boundary time signal for time zones, numeral 18 a reference value setting switch which similarly delivers a reference value signal for each time zone, and numeral 19 a microcomputer similarly disposed, which has a CPU 20, a ROM 21, a RAM 22, an input circuit 23 and an output circuit 24. Numeral 25 represents a display device constructed of a CRT which is disposed in the service estimation apparatus 11 in order to inform the person-in-charge of an estimated result for elevator service, and numeral 26 a recording device constructed of a printer which is similarly disposed in order to record the estimated result for the elevator service.

Figure 6:
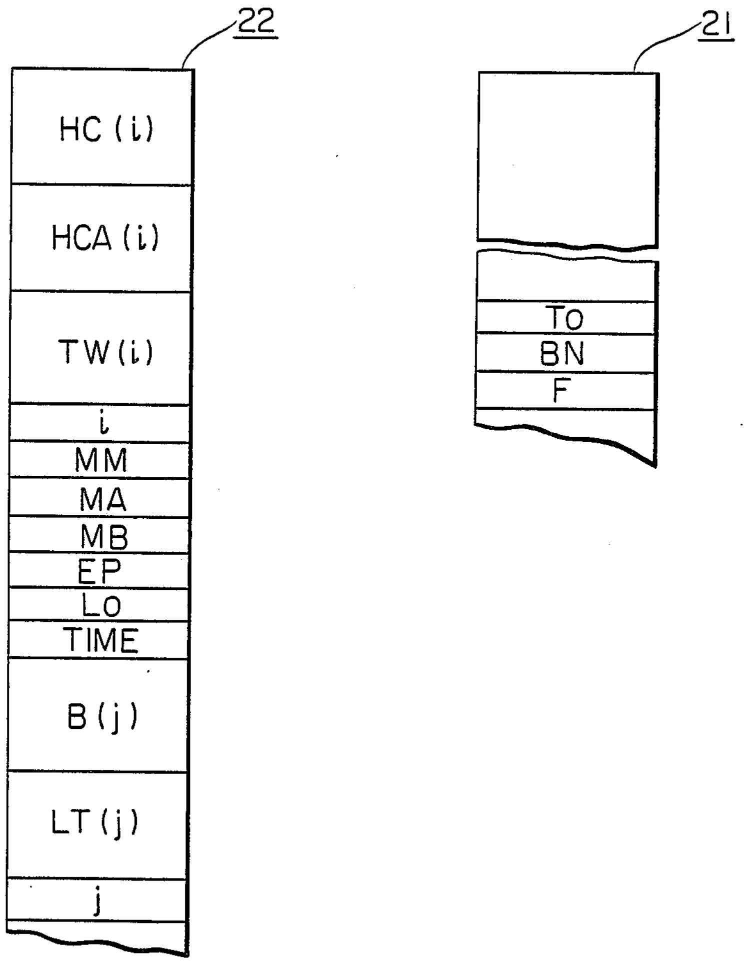

FIG. 6 is a diagram showing memory maps in the ROM 21 and the RAM 22. $T_O$ in the figure denotes data which indicates a calculation cycle for executing an estimation program shown in FIG. 7, and which is set as 1 (second). F denotes fixed value data which expresses the number of stop floors and which is set as 8 (floors), and BN denotes data which expresses the number of the time zones to be set by the time zone setting switch 17 and which is set as 7.

i denotes data which expresses Nos. of halls set in correspondence with hall buttons (for individual directions), and which is as listed in Table 1.

TABLE 1

| Direction | Up Direction | | | | | | | | Down Direction | | | | | |
|---|---|---|---|---|---|---|---|---|---|---|---|---|---|---|
| Floor | 1 | 2 | 3 | 4 | 5 | 6 | 7 | 8 | 7 | 6 | 5 | 4 | 3 | 2 |
| Hall No. i | 1 | 2 | 3 | 4 | 5 | 6 | 7 | 8 | 9 | 10 | 11 | 12 | 13 | 14 |

HC(i) (i=1, 2, . . . , 14) indicates hall call data items which are input from the group supervision device 10 through the input circuit 23, and which are respectively set to "0" when hall calls are not registered and to "1" when they are registered. HCA(i) (i=1, 2, . . . , 14) indicates hall call data items which respectively store the hall call data HC(i) (i=1, 2, . . . , 14) in the last calculation cycles, and TW(i) (i=1, 2, . . . , 14) indicates data items which respectively express the periods of waiting time of the corresponding hall calls. TIME indicates data which is input from the clock 16 through the input circuit 23 and which expresses a time, and j indicates data which expresses No. of the time zone set by the time zone setting switch 17. B(j) (j=1, 2, . . . , 7) indicates data items which are input from the time zone setting switches 17 through the input circuit 23 and which respectively express the boundary times (start times) of the individual time zones, while LT(j) (j=1, 2, . . . , 7) indicates data items which are input from the reference value setting switch 18 through the input circuit 23 and which respectively express reference values for designating the ranges of the periods of waiting time in the individual time zones. $L_O$ indicates data which expresses the reference value in a certain time zone presently under calculation, MM data which expresses the number of hall calls registered and responded to until the present time since the initiation of the time zone presently under calculation, MA data which expresses the mean value of the periods of waiting time of the hall calls responded to as described above, MB data which expresses the variance of the periods of waiting time of the hall calls responded to as described above, and EP data which expresses the presumed value of the upper limit value of the unachieved rate of service reference corresponding to the reference value in the time zone.

Next, the operation of the embodiment will be described with reference to FIG. 7.

Figure 7:
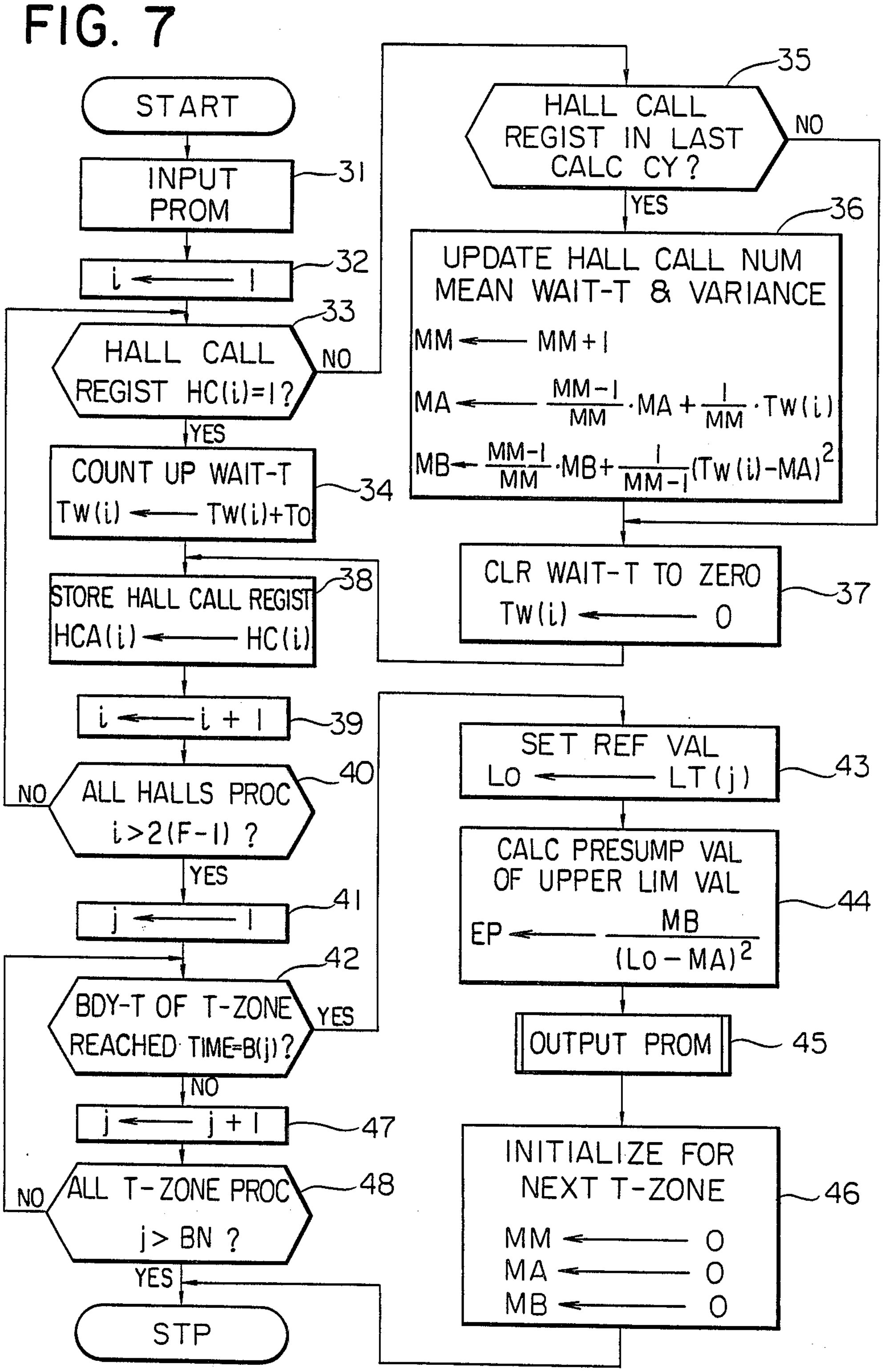

FIG. 7 is a flow chart showing the whole service estimation program which is stored in the ROM 21 of the microcomputer 19. Steps 31-48 are executed in every calculation cycle $T_O$ (=1 second).

First, in the input program of the step 31, signals are input from the group supervision device 10, clock 16, time zone setting switch 17 and reference value setting switch 18 through the input circuit 23, to set the hall call data HC(i) (i=1, 2, . . . , 14), time data TIME, boundary time data B(j) (j=1, 2, . . . , 7) and reference value data LT(j) (J=1, 2, . . . 7).

Subsequently, the steps 32-40 perform counting hall calls, updating the number of hall calls, and measurements on periods of waiting time, such as the updating of the mean value and variance of periods of waiting time. At the step 32, hall No. i is initialized to "1". Thenceforth, the processes of the steps 33-40 are repeated for all hall Nos. i=1, 2, . . . , 14. If, at the step 33, a hall call corresponding to hall No. i is registered, that is, the hall call data HC(i)=1 holds, then the control flow proceeds to the step 34. Here, the waiting time data TW(i) is counted up by the calculation cycle $T_O$ (=1 second), whereupon the control flow proceeds to the step 38. On the other hand, if a hall call is not registered, that is, the hall call data HC(i)=0 holds, then the step 33 is followed by the step 35, which decides whether or not the hall call was canceled immediately before. If the hall call was canceled immediately before, the hall call data HCA(i) in the last calculation cycle was "1", and hence, the control flow proceeds to the step 36. Here, the hall call number data MM is counted up by "1", and the mean value data MA and variance data MB of the periods of waiting time are successively updated in accordance with the following equations (15) and (16):

$$a_{m+1} = \frac{m}{m+1} \cdot am + \frac{1}{m+1} \cdot x_{m+1} \quad (15)$$

$$b^2_{m+1} = \frac{m}{m+1} b_m{}^2 + \frac{1}{m} \cdot (x_{m+1} - a_{m+1})^2 \quad (16)$$

Here, m denotes the number of hall calls, $x_k$ (k=1,2, . . . , m, m+1) denotes the periods of waiting time of the hall calls, $a_m$ and $a_{m+1}$ denote the mean values of the periods of waiting time $x_k$, and $b^2m$ and $b^2{}_{m+1}$ denote the variance of the periods of waiting time $x_k$. They are expressed as:

$$a_m = \frac{1}{m} \sum_{k=1}^{m} x_k \quad (17)$$

$$a_{m+1} = \frac{1}{m+1} \sum_{k=1}^{m+1} x_k \quad (18)$$

$$b^2{}_m = \frac{1}{m} \sum_{k=1}^{m} (xk - a_m)^2 \quad (19)$$

$$b^2{}_{m+1} = \frac{1}{m+1} \sum_{k=1}^{m+1} (xk - a_{m+1})^2 \quad (20)$$

The equations (15) and (16) are derived from these equations (17)-(20). In case of calcuating the mean value $a_m$ and the variance $b^2m$ in accordance with the equations (15) and (16), it is not necessary to store all of the m periods of waiting time $x_k$ (k=1, 2, . . . , m), which produces the advantage that the memory capacity of the RAM 22 can be saved. After the hall call number data MM, mean value data MA and variance data MB have been updated at the step 36 in this manner, the waiting time data TW(i) is set to "0" at the step 37, and the control flow proceeds to the step 38. In contrast to the above, if a hall call was not cancelled immediately before at the step 35, the hall call data HCA(i) in the last calculation cycle was "0", so that the step 37 sets the waiting time data TW(i) to "0" and is followed by the step 38.

At the step 38, in order to store the hall call data HC(i), it is set as the hall call data HCA(i). At the next step 39, the hall No. i is counted up by "1". The step 40 decides whether or not the processes have ended for all the halls. If they have not ended yet, the control flow returns to the step 33, and similar processes are performed as to the next hall No. i. When the processes have ended for all the halls, the control flow proceeds to the step 41.

Next, the steps 41-48 perform setting a reference value at the boundary of time zones, presuming the upper limit value of the probability of occurrence of predetermined hall calls, outputting signals, and initialization for calculations in the next time zone.

The step 41 initializes time zone No. j to "1", and the steps 42, 47 and 48 decide if boundary times have been reached for all the time zone Nos. j=1, 2, . . . , 7. Let it be assumed that the boundary time data B(j) (J=1, 2, . . . , 7) and the reference value data LT(j) (J=1, 2, . . . , 7) be set as listed in Table 2, and that the time data TIME be 10:00. Then, TIME=B(3) holds at the step 42. The control flow therefore proceeds to the step 43, at which the reference value data LT(3)=60 (seconds) corresponding to the time zone No. j=3 is set as the reference value data $L_O$.

TABLE 2

| Time Zone No. j | 1 | 2 | 3 | 4 | 5 | 6 | 7 |
|---|---|---|---|---|---|---|---|
| Boundary Time B (j) (Start Time) | 00:00 | 9:00 | 10:00 | 12:00 | 13:00 | 18:00 | 19:00 |
| Reference Value LT (j) | 40 sec | 60 sec | 60 sec | 60 sec | 60 sec | 60 sec | 40 sec |

At the next step 44, the presumptive value EP of the upper limit value of the probability of occurrence of the predetermined hall calls, namely, the unachieved rate of service reference is calculated according to Eq. (12) on the basis of the mean value MA, variance MB and reference value $L_O$ of the periods of waiting time.

The output program of the step 45 functions to deliver the time zone No. j, the hall call number MM, the mean value MA, variance MB and reference value $L_O$ of the periods of waiting time, and the presumed value EP of the upper limit value to the CRT 25 and the printer 26 through the output circuit 24 so as to display and record the service situation in the time zone j. At the step 46, the hall call number MM, mean value MA and variance MB are set to "0" in order to measure periods of waiting time in the next time zone, whereupon the processes of the service estimation program end.

On the other hand, when the boundary time of the time zones is not met, for example, when the time data TIME is 11:00, the control flow proceeds from the step 42 to the step 47, at which the time zone No. j is counted up by "1". The step 48 decides whether or not the processes for all the time zones have ended. Unless they have ended, the control flow returns to the step 42, and the steps 42→47→48 are repeated. When the processes for all the time zones have ended, the processes of the service estimation program in the current calculation cycle end.

In this manner, according to the embodiment of this invention, in a service estimation apparatus for an elevator wherein the quality of service, namely, whether the service of the elevator is good or bad, is decided on the basis of the unachieved rate of service reference of periods of waiting time corresponding to a preset reference value, the presumed value of the upper limit value of the unachieved rate of service reference is adopted as a service index, so that constants which depend upon a building, a group-supervisory system, etc. need not be set beforehand and that the quality of service can be properly decided even when the number of hall calls is not sufficient or when the set reference value is too great.

In addition in the embodiment, the calculated service index is displayed on the CRT 25, so that the person in charge can immediately grasp a service situation and it is recorded by the printer 26, so that the person in charge can know the change of the service situation later even when he/she was not in front of the CRT 25.

While, in the embodiment, a period of service time is the period of waiting time of a hall call, the former is not restricted to the latter. By way of example, it is also allowed that a period of continutation time of cage calls corresponding to a riding period of time is measured using cage call data instead of the hall call data HC(i) (i=1, 2, . . . , 14), so as to calculate a service index for the riding period of time, or that the sum between the period of waiting time of a hall call and the period of continuation time of the cage calls is measured for each cage call, so as to calculate a service index for a service completion period of time. It is to be understood that this invention is applicable to any service estimation apparatus as long as the degree of service measured in terms of the length of a period of time is used as the object of service estimation.

While, in the embodiment, the reference values LT(j) (j=1, 2, . . . , 7) in respective time zones are set by the setting switch 18, the way of setting reference values is not restricted thereto. It is also allowed that fixed data items are set in the ROM 21 beforehand, whereupon any of them is selected in each time zone so as to set the reference value $L_O$.

Further, while the embodiment employs the CRT as the display device and the printer as the recording device, the display device and the recording device are not restricted thereto. The CRT may well be replaced with a flat display which employs LEDs or a liquid crystal for display elements or which an audio indicator, and the printer may well be replaced with a recorder which uses a magnetic tape, a magnetic disc or the like.

Further, while the setting switches 17, 18, the CRT 25 and the printer 26 are installed in the machinery room, the place of installation of these devices is not restricted to the machinery room, but it is also easy to install them in a caretaker's room or in a maintenance company or the like through the connection of them by a telephone circuit or the like.

Further, while the embodiment has been described as to the apparatus in which the period of waiting time of the elevator operating in an actual building is measured as the period of service time, the period of service time to be measured need not always be based on the actual elevator. This invention is also applicable to, for example, a case where an object to be handled is a simulative period of service time obtained when the group supervision simulation of an elevator is done by an electronic computer so as to estimate a service performance dependent upon a group-supervisory system and control parameters.

As described above, according to this invention, in a service estimation apparatus wherein the quality of service, namely, whether the service of an elevator is good or bad, is decided according to the unachieved rate of service reference of periods of service time corresponding to a preset reference value, the presumed value of the upper limit value of the unachieved rate of service reference is adopted as a service index, so that the quality of the elevator service relative to a traffic state in a building is permitted to be simply decided.

What is claimed is:

1. A service estimation apparatus for controlling elevators using an estimated index which represents quality of service comprising means to measure periods of service time by an elevator for passengers using the elevator and to calculate a mean value and a variance of the periods of service times, means to set a reference value for designating a range of the periods of service time, means to determine an upper limit presumption value based on the mean value, the variance, and the reference value, and to deliver the upper limit value as the estimated index, means to determine an unachieved rate of service reference corresponding to the upper limit presumption value which is a probability value at which the periods of service time of the elevator fall outside the range designated by the reference value, and means to deliver an estimated result for elevator service based upon the estimated index.

2. A service estimation apparatus for an elevator according to claim 1 wherein the upper limit value presumption means presumes the upper limit value in accordance with the formula:

$$f=b^2/(l_0-a)^2$$

where a denotes the mean value, $b^2$ the variance, and $l_0$ the reference value of the periods of service time.

3. A service estimation apparatus for an elevator according to claim 1 further comprising time zone setting means to divide a period of time during which the elevator is operated into a plurality of time zones, the reference value setting means setting the reference values in correspondence with the respective time zones.

4. A service estimation apparatus for an elevator according to claim 3 wherein the mean value and variance calculation means calculates the mean value and the variance for each of the time zones, and the upper limit value is determined on the bssis of the mean value, the variance, and the reference value of each of the time zones.

5. A service estimation apparatus for an elevator according to claim 1 wherein said setting means calculates the mean value and the variance of the elevator service time on the basis of periods of waiting time for hall calls.

6. A service estimation apparatus for an elevator according to claim 1 wherein when a hall call is cancelled, the mean value and variance calculation means decides whether or not the hall call was cancelled immediately before, and if it was cancelled immediately before, said means calculates the mean value and the variance anew on the basis of a period of waiting time of the cancelled hall call and the mean value and the variance used until the decision is made.

7. A service estimatiion apparatus for an elevator according to claim 5 wherein said mean value and variance calculation means receives the periods of waiting time as to all halls having the hall calls and calculates the mean vlue and the variance on the basis of them.

8. A service estimation apparatus for an elevator according to claim 1 further comprising display means to display the upper limit value delivered by the upper limit value presumption means, said display means displaying a change of a service state.

9. A service estimation apparatus for an elevator according to claim 1 wherein the mean value and variance calculation means calculates the mean value and the variance of the periods of service time by the elevator, on the basis of either of periods of time during which cage calls continue and values of sums between periods of waiting time of hall calls and the periods of continuation time of the cage calls.

* * * * *